United States Patent [19]

Smith, Jr.

[11] 3,986,938
[45] Oct. 19, 1976

[54] DIRECT CONTACT OF LOW-BOILING, WATER-IMMISCIBLE MEDIUM WITH HOT AND COLD BODIES OF WATER TO TRANSFER HEAT FOR PURPOSES OF ENERGY PRODUCTION AND/OR DESALINATION

[76] Inventor: Calvin S. Smith, Jr., 8529 Betty Lane, El Cerrito, Calif. 94530

[22] Filed: June 19, 1974

[21] Appl. No.: 480,963

Related U.S. Application Data

[63] Continuation-in-part of Ser. Nos. 224,018, Feb. 7, 1972, Pat. No. 3,856,631, and Ser. No. 19,592, March 16, 1970, Pat. No. 3,640,850.

[52] U.S. Cl. .............................. 203/11; 202/234; 202/173; 203/73; 159/DIG. 33; 159/1 S
[51] Int. Cl.² ...................... B01D 1/00; B01D 3/02; B01D 3/00; B01D 3/10
[58] Field of Search ............... 159/DIG. 17; 203/11, 203/100 DC; 60/641

[56] References Cited
UNITED STATES PATENTS

| | | | |
|---|---|---|---|
| 2,006,985 | 7/1935 | Claude et al. | 203/DIG. 17 |
| 2,749,094 | 6/1956 | Lewis et al. | 159/DIG. 17 |
| 3,232,847 | 2/1966 | Hoff | 159/DIG. 17 |
| 3,337,421 | 8/1967 | El-Roy | 159/DIG. 17 |
| 3,410,339 | 11/1968 | Wiegandt | 159/DIG. 17 |
| 3,627,646 | 12/1971 | Osdor | 159/DIG. 17 |
| 3,640,631 | 2/1972 | Smith, Jr. | 159/DIG. 17 |
| 3,734,160 | 5/1973 | Osdor | 159/DIG. 17 |
| 3,741,878 | 6/1973 | Osdor | 159/DIG. 17 |
| 3,855,079 | 12/1974 | Greenfield | 159/DIG. 17 |
| 3,856,631 | 12/1974 | Smith, Jr. | 159/DIG. 17 |

OTHER PUBLICATIONS

Acobor (Association pour l'Organization de Colloques Occanologiques à Bordeaux B.P. 315-16, 75767 Paris cedex 16-France vol. 2.

Primary Examiner—Jack Sofer

[57] ABSTRACT

A low boiling, water immiscible medium is directly contacted in liquid state with relatively hot or warm water (e.g. with hot recycled fresh water in a desalination system or with warm surface sea water in an energy production system) and in vapor state with relatively cold or cool water (e.g. surface sea water in a desalination system or deep sea water in an energy production system) whereby thermal energy is efficiently transferred between the phases that are so contacted; the energy transfer is for the purpose of evaporating the immiscible liquid in an energy production system and is for the purpose of evaporating saline water in a desalination system; and the effluent from the process which is returned to its natural environment (e.g. to the sea) is treated to remove all significant amounts of entrained and dissolved immiscible medium.

26 Claims, 4 Drawing Figures

DIRECT CONTACT OF LOW-BOILING, WATER-IMMISCIBLE MEDIUM WITH HOT AND COLD BODIES OF WATER TO TRANSFER HEAT FOR PURPOSES OF ENERGY PRODUCTION AND/OR DESALINATION

This application is a continuation-in-part of my co-pending application, Ser. No. 224,018 filed Feb. 7, 1972 entitled "Process and Apparatus for Separating Water from Non-Volatile Solutes," now U.S. Pat. No. 3,856,631 and of my application, Ser. No. 19,592, filed Mar. 16, 1970, entitled "Process for Producing Fresh Water from Salt Water," now U.S. Pat. No. 3,640,850.

This invention relates to heat transfer between a low boiling water immiscible medium and water for the purpose of desalination and/or for the purpose of energy production. The invention relates more particularly to the utilization of thermal energy in natural bodies of water, especially surface sea water, for the production of mechanical energy. Other suitable sources of warm and hot water than sea are geothermal steam and water. The invention is described below primarily in relation to the production of mechanical energy from sea water.

Sea water from the surface to a depth of about 100 feet is relatively warm. This surface water varies in temperature (degrees F.) from about 50° to about 95° depending upon the location and the season. For example, off the coast of California the mean surface water temperature during August 1969 was 71° F. and in October it was 65.4° F.; in the Gulf of Mexico off Texas and Louisiana it was 83° F. and 73.7° (August and October, 1969, respectively) and in the Persian Gulf it was 92.4° and 83.2° (August and October, 1969, respectively). Below about 1,000 feet the temperature of the ocean is uniform throughout the world and is approximately 35° F. regardless of location and season.

The warm surface water of the ocean provides a limitless source of thermal energy which is constantly renewed by absorption of solar radiation. The cold water below 1,000 feet provides a limitless source of cooling water for cooling and condensing a working fluid to be recycled provided this cycle (utilization of warm surface water as a source of heat and utilization of cold deep water in a condenser) can be carried out efficiently. This cold water is continuously renewed in the arctic zones.

It is an object of the present invention to provide an efficient means of employing the temperature differential between warm surface water and the cold deep water of large bodies of water, more particularly, the sea to produce useful energy.

It is a further and more general object to utilize more efficiently than heretofore various natural sources of warm or hot water and steam including hot springs, geysers and the like as well as warm surface sea water, together with adjacent or easily available natural sources of cold water such as springs, lakes, rivers and deep sea water to generate useful mechanical energy.

It is a general object of the present invention to make possible and efficient the operation of a prime mover such as a gas turbine by means of gas resulting from vaporization of a volatile working fluid by means of hot or warm water; to condense the spent gas by means of cool or cold water; and to accomplish such heat interchange between hot or warm water and liquid working fluid and between spent gas of working fluid and cool or cold water with an efficiency such as to render it possible to operate in a practical way utilizing small temperature differences between hot or warm and cool or cold water sources, such differences being of the order of, say, 10° to 100°F or so.

Yet another object is to provide efficient production of mechanical energy in accordance with the preceding objects whilst avoiding or minimizing pollution of natural bodies of water.

A still further object is to provide, in an energy production system, in a desalination system and in combined energy production-desalination systems, an efficient direct contact (immiscible fluid-liquid aqueous phase contact) method and apparatus whereby aqueous phase that is withdrawn from the system and returned to its natural environment is freed of all significant quantities of pollutant such as entrained and dissolved immiscible medium.

The above and other objects will be apparent from the ensuing description and the appended claims.

In accordance with the present invention, a water immiscible volatile liquid below the boiling point of water, such being typified by normal butane, (b.p. at atmospheric pressure = 31° F.), is employed as the working fluid; while in the liquid state it is directly and intimately mixed with and contacted with warm or hot water or steam, e.g., warm surface sea water, to vaporize the liquid working fluid; the resulting vapor of working fluid under suitable pressure, is employed to operate an energy converter such as a gas turbine, which in turn operates a machine such as an electric generator from which useful energy can be obtained; and the exhaust gas from the energy converter (the spent vapor of working fluid) is condensed by direct, intimate contact with cold water from a natural source, such as cold sea water from the depths. Other suitable energy converters or prime movers include multicylinder piston engines and lobe type machines.

Hereinafter sea water will be referred to primarily as it is the most common natural source of both warm and cold water, but it will be understood that warm or hot water, also steam, may be employed from other sources such as hot springs and geysers in conjunction with cold deep sea water or cold surface waters from springs, lakes and streams.

Heretofore, it has been proposed to utilize warm surface sea water, e.g. at 85° F. by flashing it e.g. at 70° F. by reduction of pressure and to utilize resulting water vapor (low temperature steam) to operate a turbine, with the spent vapor leaving the turbine, for example at 50° F. The thermodynamics of the procedure, even neglecting friction losses, are such that enormous volumes of water vapor and correspondingly large equipment must be employed. It has also, and more recently, been proposed to employ warm surface sea water as a heat source for indirect (out-of-contact) heat transfer to a volatile working fluid to produce a gas under pressure and to employ cold deep sea water for indirect (out-of-contact) heat transfer from spent gas or vapor of such working fluid to effect condensation of the gas. This provides the advantage of a more volatile working fluid than water, but it suffers from the disadvantages of heat transfer at low temperature differentials across a barrier (such as tubes used to separate the aqueous and non-aqueous fluids) and it also suffers the disadvantage of corrosion, especially where sea water is used, and of costly equipment made usually of copper alloys to eliminate corrosion.

The direct contact feature of the present process, both in the evaporation and condensation of the immiscible working fluid (hereinafter referred to as "working fluid") results in greatly increased efficiency and makes practical the economic utilization of the modest temperature differentials which exist between, for example, warm surface sea water and deep cold sea water. Such differentials are typically about 30°–50° F., although even smaller differentials may be employed. In certain areas and at certain seasons larger differentials are available. As compared to a working fluid such as steam generated at high pressure and temperature by the burning of a fossil fuel in a boiler and exhausted from a prime mover such as a steam turbine at a temperature of about 100° F., the temperature differentials available between surface and deep sea waters are small, but they are efficiently utilized by the present invention.

The working fluid of the present invention is one which is more volatile than water, i.e. boils at atmospheric pressure substantially below 212° F. (100° C.) If the warm water source is one which is relatively hot, e.g. geothermal water at 212° F., a working fluid boiling at atmospheric pressure at 150° to 175° F. (e.g. n-hexane, boiling point 150° F.) may be used; but if the warm water source is warm surface sea water at 70° – 84° F. a much lower boiling working fluid, e.g. boiling at about 30° F. or less at atmospheric pressure is preferred. Among other desirable properties of the working fluid are very low solubility in water whereby it can be substantially completely separated from the spent water before it is dumped back into the sea or elsewhere and will not cause pollution problems and will not cause an unacceptable loss of working fluid. Solubility of working fluid in water of the order of solubilities of hydrocarbons such as normal butane are acceptable both from non-pollution and recovery considerations.

It is preferable that the working fluid, in its liquid state and at the working temperatures (hot and cold ends) have a low viscosity and a low surface tension. Again, the viscosity and surface tension of hydrocarbons such as butane are acceptable. Higher viscosities result in lower rates of heat transfer from warm water to the liquid working fluid and higher surface tensions result in larger droplets, hence the less surface per unit of liquid volume of liquid working fluid.

A further consideration is the tendancy of the working fluid to form hydrates. Hydrocarbons form hydrates at low temperatures and high pressures. Such hydrates are solid and are to be avoided. However, under normal conditions prevailing in the practice of the present invention, formation of hydrates is not a problem.

Further, the working fluid should, in the liquid state, be substantially less dense or more dense than water and sea water such that gravity separation is readily accomplished. Less dense working fluids are preferred. Centrifugation may be employed to aid gravity separation.

Certain working fluids are more readily biodegradable and/or are less toxic than others and for such reasons are to be preferred. Biodegradability and toxicity are related, of course, to the degree of recovery of the working fluid and its exclusion from water dumped back into the sea or elsewhere. If the concentration of working fluid in the vented water is below acceptable limits, then a less biodegradable and more toxic working fluid may be used. Paraffinic hydrocarbons, especially straight chain paraffinic hydrocarbons such as normal butane, are more biodegradable. Branched chain paraffinic and aromatic hydrocarbons are less biodegradable. Cyclohexane has the advantage of extremely low solubility.

As will be apparent from the following description, in the preferred embodiments of the invention the last traces of working fluid (dissolved and entrained) are removed from both the surface sea water which is used as a source of heat and the cold deep water which is used as the condensing medium. This contributes to the economy of the process because virtually all of the working fluid is recycled. Also, pollution problems are reduced to a point of insignificance.

The working fluid, typified by normal butane, may be any volatile, water immiscible liquid boiling at atmospheric pressure below about 175° F., and preferably much lower if warm surface sea water is the source of heat. The working fluid may be normally gaseous at room temperature (177° F.) and atmospheric pressure, e.g. butane or propane or it may be normally liquid such as hexane. Preferably a working fluid is used which requires a vapor pressure of 5 to 100 psia (pounds per square inch absolute) to maintain it in liquid state at temperature of about 35° to 250° F., but which also boils at atmospheric pressure at a temperature not greater than about 175° F. Working fluids which boil at atmospheric pressure at about −50° to +40° F. are preferred when sea water is used.

Examples of suitable working fluids, subject to considerations described above, are single molecular hydrocarbon species such as normal butane, isobutane, propane, the various pentanes and hexanes. Normal butane is preferred where sea water is employed. If a source of hot water, e.g. geothermal water at 200° F., and cold water at, say, 80° F. are employed, a higher boiling hydrocarbon such as pentane would be preferred. With hotter sources of water, normal hexane would be preferred. Non-hydrocarbon species may be used such as tetrafluoromethane, monochlortrifluormethane, dichlordifluoromethane, dichloromonofluoromethane. Further, mixtures of molecular species may be used such as gasoline, mixtures of propane, butanes and pentanes, and mixtures of any two or more of the foregoing halocarbons.

In the drawings described below and in the claims certain symbols are used to designate the various fluids (liquid and vapor states, aqueous and working fluids) which are encountered. These symbols are as follows:

FW signifies fresh water in the liquid phase.
WV signifies water vapor.
CW signifies relatively cold water in the liquid phase, including fresh or saline water.
HW signifies relatively warm or hot water in the liquid phase, including fresh or saline water.
SW signifies sea water.
HSW signifies relatively warm sea water, e.g. surface sea water as contrasted with deep sea water.
CSW signifies relatively cold sea water, e.g. sea water from a depth of 1,000 feet, temperature = 35° F.
UW signifies water in the liquid phase that has been used in the process of the invention and which contains dissolved and entrained WF and has not yet been completely treated to remove dissolved and entrained working fluid.
TW signifies UW which has been treated to remove dissolved and entrained working fluid and is ready to discard to the environment.

USW and TSW signify UW and TW, respectively, where the water is sea water.

WF signifies working fluid, whether relatively hot or cold and whether in the vapor phase or the liquid phase.

VWF signifies working fluid in the vapor phase.

LWF signifies working fluid in the liquid phase.

NCG signifies non-condensible gases such as air.

CFW signifies relatively cold or cool fresh water in the liquid phase.

HFW signfies relatively warm or hot fresh water in the liquid phase.

Certain of the symbols appearing above are not shown in the drawings or claims but are employed in the table of symbols above and in the legend on FIG. 1 of the drawings to signify a class of fluids of which a particlar member is shown in the drawings or in the claims. For example, UW signifies the class of used water (as defined) and a member of the UW class is used sea water (USW). Similarly, TW signifies the class of treated water (as defined) and a member of the TW class is treated sea water (TSW).

Certain preferred embodiments of the invention are illustrated by way of example in the accompanying drawings in which:

FIG. 1 illustrates a system in which warm surface sea water (HSW) is contacted directly with normal butane (an example of a working fluid WF) in the contact section of an evaporation zone (Zone I) and gravity separation is carried out in another section of the same zone; the resulting vapor of normal butane is employed to operate a gas turbine which in turn operates an electric generator; the surface sea water cooled by vaporization of butane is withdrawn; exhaust gas (butane vapor in a cooled state) from the turbine is directly and intimately mixed in the contact section of a second zone (Zone II) with incoming cold deep sea water (CSW), bringing about condensation of the vapor of working fluid (VWF); and the resulting mixture of condensate of working fluid (LWF) and sea water (USW) are separated in a quiescent section of the same zone; the condensate is returned to Zone I and the separated deep sea water (USW) along with the separated surface sea water (USW) from Zone I are processed to remove dissolved and entrained working fluid and are returned to the sea as treated sea water (TSW).

Figure 1:
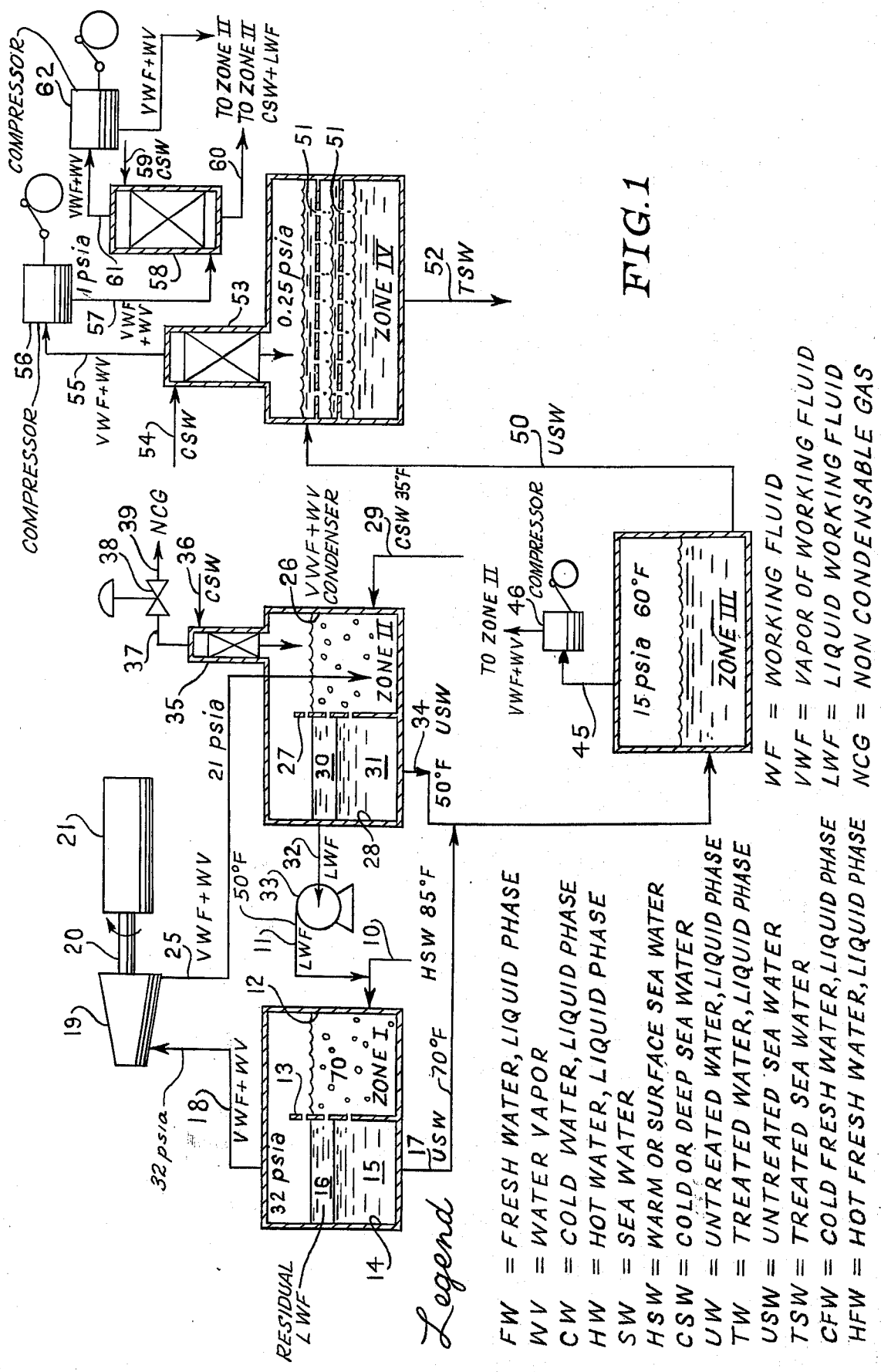

Referring to FIG. 1, warm sea water (HSW) at, for example, 85° F. enters Zone I through the line 10. This warm sea water is pumped by an ordinary pump (not shown) from near the surface of the sea but sufficiently below the surface that surface disturbances do not cause entry of air and floating debris. Suitable means (not shown) will be employed to filter and purify the sea water, including both the warm surface water and cold deep sea water introduced as described below, to remove solid matter, marine life, etc.

The incoming stream of warm surface water (HSW) is joined by a stream of liquid working fluid (LWF) entering through line 11 and the combined streams enter the contact section 12 of Zone I. This contact section is separated by a perforated barrier or baffle 13 from a quiescent settling section 14. The contact section 12 relies mainly on vigorous boiling of the liquid working fluid for agitation and mixing but it may also be provided with mixing and contact devices such as baffles, draft tubes, rotating paddles and the like to distribute the liquid working fluid, all to the end of promoting intimate as well as direct contact of the two media (the warm sea water and the liquid working fluid), whereby the latter is warmed and the three media [the sea water, the liquid working fluid and vapor of working fluid (VWF)] come to a virtual equilibrium. Preferably, for maximum efficiency of heat transfer, an excess of liquid working fluid is maintained at all times, for example, about 10 to 20% of the volume of liquid in Zone I is liquid working fluid. The baffle 13 may be imperforate part of the way up to minimize disturbance in settling area 14.

A typical vapor pressure and corresponding temperature are shown in Zone I. The two substantially equilibrated liquid phases (USW and LWF) pass through the perforated baffle 13 into the quiescent settling zone 14 wherein a layer of sea water (USW) settles at 15, above which is a layer 16 of residual liquid working fluid (LWF). Excess liquid working fluid will flow back through perforated baffle 13 to the turbulent, contact section 12. The separated, thermally spent sea water (USW) is removed through line 17 and is processed as descirbed hereinafter. Vapor of working fluid and water vapor (VWF + WV) is conducted from Zone I through line 18 to the inlet of a prime mover (such as a gas turbine) 19 which is connected by a shaft 20 to a generator 21. The prime mover 19 may be of any known suitable type suited to work on gases at relatively low pressure, typically about 32 psia. Exhaust gases, e.g., at 21 psia are removed from the outlet of the prime mover through line 25 for processing as will now be described.

The exhaust gases from the prime mover (such as a turbine) 19 enter through line 25 into the lower portion of the contact section 26 of Zone II. The contact section is divided by a baffle 27 which is perforated at the top, from a quiescent zone and settling area 28. Cold sea water (CSW) from a depth of about 1,000 feet or more is introduced through line 29 into contact section 26. The gases of working fluid (VWF) are caused to have intimate contact with the cold sea water (CSW) by any suitable means such as mechanical agitation means, spargers, bubble caps, sieve trays or any combination thereof to the end that the cold sea water will condense the gases efficiently. The resulting mixture of sea water (USW) and condensate (LWF) flows through the perforated baffle 27 into settling section 28 where the two media separate by gravity into an upper layer 30 of liquid working fluid (LWF) and a lower layer 31 of deep sea water (USW) that has been warmed by the latent heat of condensation of the vapor of working fluid (VWF). The liquid working fluid (LWF) is withdrawn through line 32 by pump 33 for recycling to Zone I. Deep sea water (USW), now warmed typically to about 50° F., is withdrawn through line 34 and joins the cooled surface sea water (USW) in line 17.

To prevent unwanted buildup of permanent or non-condensible gases (NCG), such as air dissolved in the sea water, a scrubber 35 is provided through which a portion of the gases from Zone II are passed. A portion of the incoming cold sea water (CSW) is introduced into scrubber 35 through line 36 to condense vapor of working fluid and also water vapor and the remaining gases pass through line 37 and control valve 38 to exit line 39. The vapor of working fluid present in the vented gases may be recovered by any of several known means such as compression and condensation, absorption in a sponge solvent, adsorption on activated carbon, etc. or it may be used as fuel in a boiler if the working fluid is combustible. Recovered liquid working fluid is returned to Zone I.

The cooled surface water (USW) from Zone I in line 17 and the warmed cold water (USW) from Zone II in line 34 are combined and passed to Zone III. In Zone III the pressure is reduced, for example, to atmospheric, whereby working fluid entrained in the sea water is flashed, and dissolved working fluid is partially flashed and the resulting mixture of vapor of working fluid (VWF) and a trace of water vapor (WV) pass through line 45 to compressor 46, thence back into Zone I or Zone II, preferably into Zone II. Zone III is optional but it provides advantages. For example, the vapor of working fluid vented at 45 is at about 15 psia and requires relatively little compression (typically to about 21 psia in the case of normal butane) before injection into Zone II. If Zone III is omitted the vapor that would be generated in Zone III will be recovered from Zone IV at much lower pressure typically about 0.25 psia, which will require much larger compresssion equipment.

Liquid from Zone III (which consists of surface and deep sea water (USW) together with a small residuum of dissolved working fluid) leaves Zone III through line 50 and enters the upper part of Zone IV. This zone is provided with one or more (shown as two, but permissibly one or three or more) plates having a multiplicity of punched holes 51 which serve to sub-divide the liquid as it falls into a multiplicity of small streams which present a large dynamic evaporating surface without any significant hydrostatic head. Pressure in Zone IV is controlled to cause enough water flashing to strip traces of working fluid from the sea water and reduce the residue (if any) of dissolved working fluid in the effluent sea water (TSW) to an acceptable level. The water (TSW) can be discharged through line 52 to the sea, preferably at a distance from the intake of warm surface water so that it does not commingle with and cool the surface water which is being drawn into the system nor commingle with cold sea water. If need be, to restore the oxygen content of the sea water to maintain marine life, oxygen, air or oxygen-enriched air may be bubbled through the effluent sea water (TSW) to restore its oxygen content. A subsidiary advantage of the process in some instances is that the relatively high mineral content of deep sea water when brought to the surface and commingled with warm surface water is very beneficial to marine life so that disposal to a sea food farm would be desirable. In other instances, the combined thermally spent surface water (TSW) and heated deep sea water (TSW) may be returned to a depth at which the sea has the temperature of the combined effluent. This will minimize ecological disturbance.

Vapor (a mixture of water vapor and gaseous working fluid) leaves Zone IV through a scrubber 53 wherein it is scrubbed with a stream of cold deep sea water (CSW) entering through line 54. This removes much of the water vapor and thereby reduces the volume of vapor that must be subsequently handled. The remaining uncondensed vapor leaves the scrubber through line 55 to compressor 56 wherein it is compressed, for example, to 1.0 psia, thence it passes through line 57 and through scrubber 58 wherein it is scrubbed with cold sea water introduced through 59. Sea water leaves scrubber 58 through line 60 and is passed to Zone II. Vapor from scrubber 58 passes through line 61 and compressor 62 and the compressed vapor is returned to Zone II.

Figure 2:
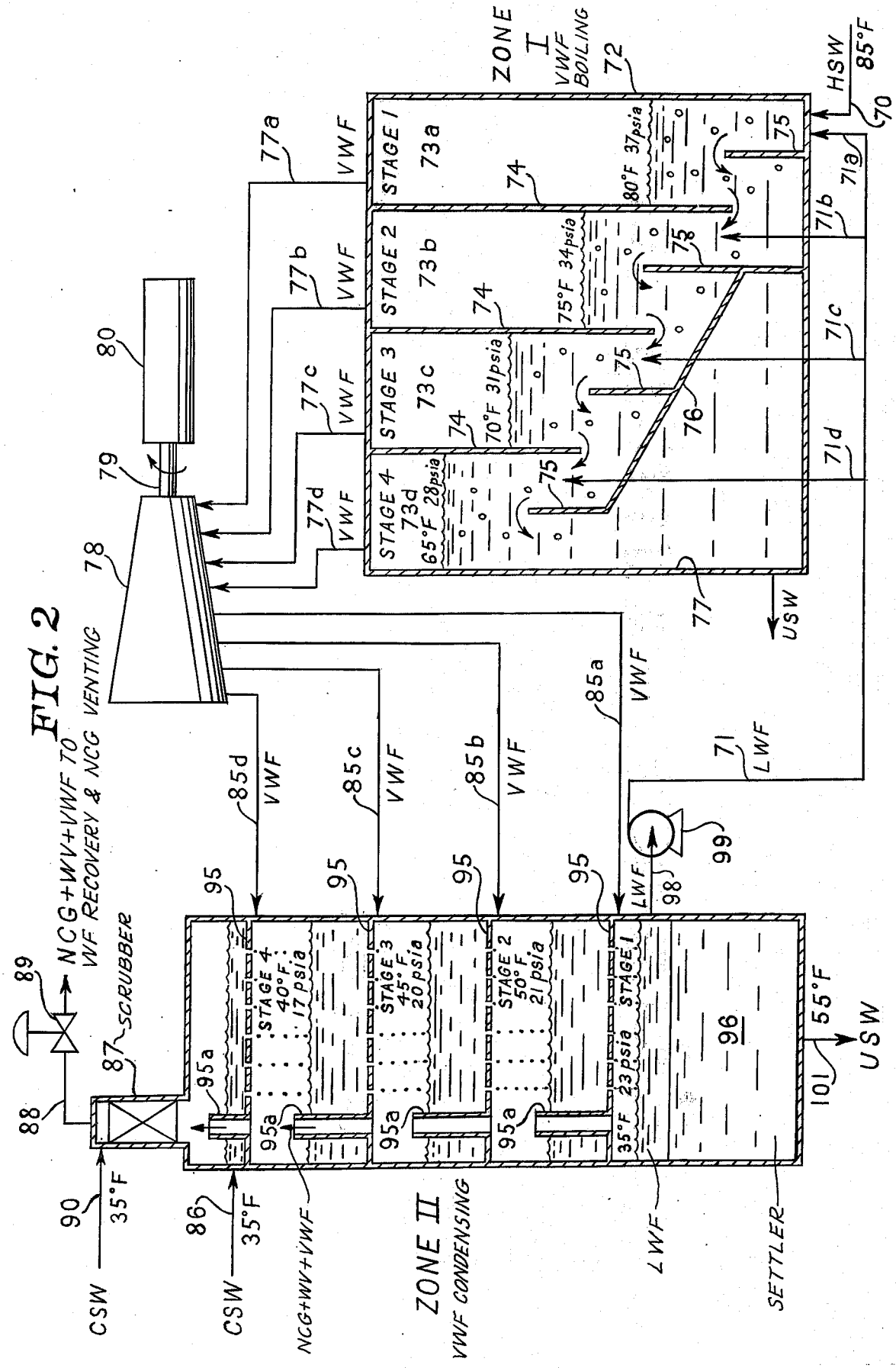
FIG. 2 illustrates a more efficient staged contact of the working fluid and sea water both in Zone I (evaporation) and Zone II (condensation).

In FIG. 2 there is shown a multi-stage system which operates more efficiently than the single stage system of FIG. 1. Thus for a given throughput of sea water it will generate more power or for a given power output it is required to handle a lesser volume of sea water. Zones I and II in FIG. 2 are the same in function as Zones I and II, respectively, in FIG. 1 but they provide a staged contact of phases with resulting increased efficiency, as will now be described.

Zone I is supplied with warm surface sea water (HSW), for example, at 85° F. through a line 70 and with recycled liquid working fluid through a line 71 and branched lines 71a, 71b, 71c, and 71d. Zone I comprises a vessel 72 which is divided into stages 73a, 73b, 73c and 73d by dividers 74 which extend downwardly from the top of the vessel. Within each of the stages there is an upwardly projecting barrier or baffle 75. Another baffle shown as slanting downwardly from left to right (but which may have any other desired configuration, position or shape) is shown at 76 which provides a settling area or basin 77. Zone I is shown as having four stages, but a greater or lesser number of stages may be employed.

As stated, warm sea water (HSW) is introduced into stage 1 of Zone I through line 70 and liquid working fluid (LWF) is introduced into the stages 1, 2, 3 and 4 by conduits 71a, 71b, 71c and 71d, respectively. Efficient contact between the liquid working fluid and sea water in each of the stages may be accomplished by any suitable means such as mixers, sieves, spargers and the like such that the liquid working fluid (LWF) is finely divided in the body of sea water. This intimacy of contact is further promoted by the fact that the liquid working fluid is undergoing vigorous vaporization and boiling, which will result in turbulence and more efficient contact. By appropriate proportioning of the liquid working fluid introduced into each of the stages, an inventory of 0.1% to 90% of the liquids in Zone I will be liquid working fluid but the preferred range (10 to 20% of the total volume of liquid will be liquid working fluid) is maintained in each stage for maximum contact and heat transfer efficiency. Sea water in stage 1 flows under the respective baffle 74 into the lower portion of stage 2 wherein it is contacted with a further increment of liquid working fluid, thence into stage 3 and finally into stage 4, in each of which it is contacted with an increment of liquid working fluid. It is then separated from liquid working fluid in the settling basin 77.

Typical pressures are shown in stages 1, 2, 3 and 4. These are typical but are not the only pressures and temperatures that may prevail in the practice of the invention. Actual pressures and temperatures will depend upon a number of factors including, among others, the temperature of the incoming surface sea water (HSW) and the trade-off of more efficient utilization of thermal energy (which requires more elaborate equipment, e.g., more stages) with simpler equipment (e.g. fewer stages) and resulting lesser efficiency.

It will be seen that the liquid level increases from stage 1 to stage 2, from stage 2 to stage 3, and from stage 3 to stage 4. This is due to the fact that the pressure is greatest in stage 1 and diminishes progressively through stages 2, 3 and 4.

Vapor of working fluid (VWF) is extracted from each of the stages through lines 77a, 77b, 77c and 77d at the temperatures and pressures prevailing in the respective stages. These increments of vapor are delivered to the respective stages of a multi-stage prime mover (such as an extraction turbine) 78 which is connected by suitable means, indicated generally at 79, to an electric generator 80 from which the power output of the system is derived. The multi-stage prime mover (such as an extraction turbine) 78 is of known type and several commercial types are available. As is well known there are automatic means for directing staged vapor inputs into appropriate stages of the multi-stage prime mover.

The multi-stage prime mover (such as an extraction turbine) 78 has corresponding outlets operating in a similar manner from which increments of spent vapor of working fluid passes by lines 85a, 85b, 85c and 85d to corresponding stages of Zone II in which typical pressures and temperatures are indicated consistent with the typical pressures and temperatures in the corresponding stages of Zone II. The coolest and lowest pressure exhaust vapor passes through line 85d to stage 4 of Zone II where it is contacted with incoming cold sea water entering through line 86. A certain small amount of vapor (a mixture of water vapor and vapor of working fluid) passes out through a scrubber 87, line 88 and pressure reducing valve 89 for processing as described in connection with FIG. 1, including venting of permanent gases to avoid undue buildup in the system. Cold sea water enters scrubber 87 through line 90.

Zone II is provided with efficient liquid-vapor contact means of any desired type such as bubble caps, sieve trays, rain decks, etc. A preferred type of liquid-vapor contact means is illustrated diagramatically in the form of plates with a multiplicity of punched holes or rain decks 95 which cause the incoming sea water to be divided into small streams as it drops from the inlet into stage 4, thence into stage 3, stage 2 and stage 1 in succession. These rain decks have the advantages of simple construction, high throughput, low pumping requirement, and low liquid inventories, and of breaking up the liquid into small jets which provide a large, fresh dynamic, constantly renewed surface with very low film resistance and hence very efficient liquid-vapor contact. Further there is no significant hydrostatic back pressure, which increases the differential pressure available for power. The lowest temperature vapor in line 85d from the multi-stage prime mover 78 is contacted with the coldest, incoming sea water; the next warmest vapor (line 85c) is contacted with sea water which has been heated by an increment in the preceding stage, etc. whereby efficient heat exchange results. Venting of inert gases is facilitated by small bleed tubes 95a.

The lower portion 96 of Zone II provides a settling basin for separation of sea water (USW) and liquid working fluid (LWF). The liquid working fluid leaves through line 98 to a pump 99, thence via line 71 back into Zone I. Sea water (USW) is removed through a line 101 for further processing as described in connection with FIG. 1.

Figure 3:
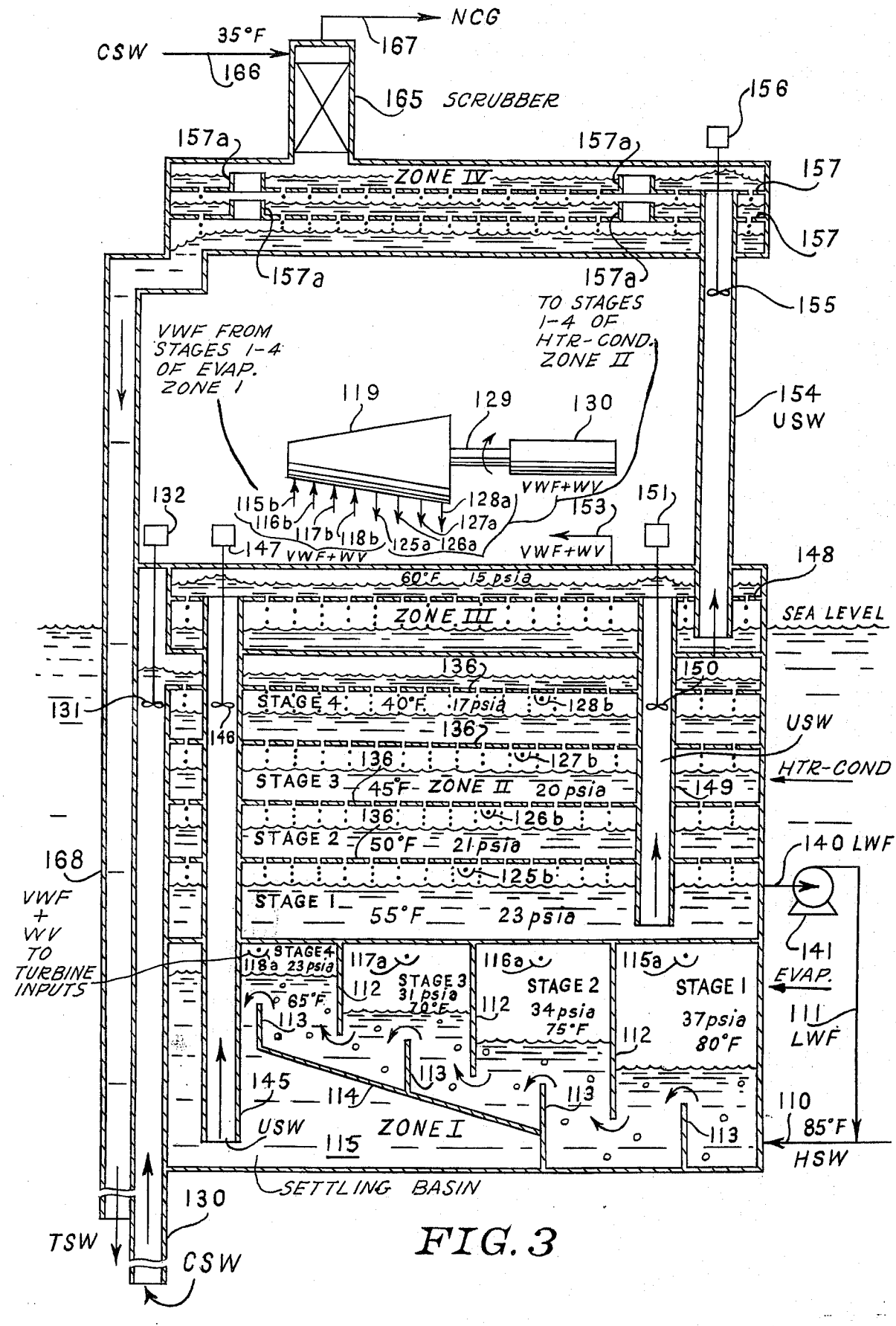
FIG. 3 shows a staged system similar to that of FIG. 2 but located on an offshore rig (floating or rigidly anchored) which makes use of hydraulic pressure differences between the surface and submerged parts of the equipment.

Referring to FIG. 3, there is shown a staged apparatus as in FIG. 2 but modified for off shore use. It may be a floating apparatus with suitable flotation and anchoring means or it may be rigidly supported on piers embedded in the ocean bottom. An advantage of this apparatus is that it makes use of hydraulic pressures to reduce pumping loads.

Warm sea water (HSW) enters through line 110 and is joined by recycled liquid working fluid (LWF) through line 111 which enter stage 1 of Zone I. The stages of Zone I (indicated as four in number but may be fewer or greater in number) are separated one from another by barriers or baffles 112 and within each of the stages there is an upwardly extending baffle 113 such that liquid can flow into each of the stages to the right of the respective baffle 113, thence over that baffle and under the respective baffle 112 into the next stage, etc. under the influence of diminishing pressure from right to left as viewed in FIG. 3. As in FIG. 2, typical pressures and temperatures are shown. Efficient contact means such as those described above in connection with FIG. 2 will, of course, be employed. As described in connection with FIGS. 1 and 2 the boiling of the liquid working fluid will promote turbulence and efficiency of contact. As the resulting mixture of sea water and liquid working fluid pass from stage to stage an increment of the liquid working fluid will be evaporated in each of the stages at successively lower pressures and temperatures. A plate or baffle 114 shown extending upwardly from right to left in FIG. 3 separates a settling basin 115 from the turbulent portion of Zone I. An inventory of liquid working fluid will be maintained in the various stages and for the purpose described above.

An increment of vapor of working fluid will pass from each of the stages through the respective outlet ports, 115a, 116a, 117a and 118a and will pass through suitable lines (not shown) to their respective inlet ports 115b, 116b, 117b and 118b of a multi-stage prime mover (such as an extraction turbine) 119, which has corresponding outlet ports 125a, 126a, 127a, and 128a. The prime mover 119 is connected by means shown at 129 to an electric generator 130 from which useful power is obtained.

The exhaust vapor thus issuing from the multi-stage prime mover 119 will pass through suitable lines (not shown) to the respective inlet ports 125b, 126b, 127b and 128b of stages 1, 2, 3 and 4, respectively, of Zone II. Cold deep sea water (CSW) enters the system through pipe 130 with the aid of pump 131 driven by motor 132 and passes into stage 4 of Zone II and descends through the respective rain decks 136 of stages 4, 3, 2 and 1 of Zone II in the manner described in connection with FIG. 2, thereby condensing the exhaust vapor of working fluid. The lower portion of Zone I is a settling area which is quiescent and allows gravity separation of resulting condensate of working fluid (LWF) which leaves through line 140 and pump 141 to be recycled. Provision is also made in Zone II for small bleed passages (not shown) from stage 1 to stage 2, from stage 2 to stage 3, from stage 3 to stage 4 and thence to a vent scrubber such as 35 in FIG. 1 or 87 in FIG. 2. This prevents accumulation of non-condensable gases (NCG) such as air.

Separated sea water (USW) passes from the settling basin of Zone I through pipe 145 by means of pump 146 driven by motor 147 into Zone III. Zone III is shown as having one stage but it may have two or more stages. The incoming water is distributed by sieves or rain decks 148. In Zone III of FIG. 3 as in Zone III of FIG. 2 the pressure is diminished, for example, to about atmospheric pressure to flash entrained liquid working fluid and part of the dissolved working fluid. Sea water is also transferred to Zone III from Zone II through a pipe 149 by means of a pump 150 driven by a motor 151. The gaseous mixture of vapor of working fluid and a trace of water vapor is vented from Zone III through a line 153 for processing as described in connection with FIG. 1 (line 45).

Sea water passes through line 154 by means of pump 155 driven by motor 156 to Zone IV, which is shown as having two stages but may have more stages or a single stage. The stages are separated by rain decks 157. Pressure is reduced by reducing hydrostatic head and by a vacuum system, for example, to 0.25 psia. Flashed vapor of water and vapor of working fluid pass through ports 157a and through scrubber 165 wherein it is scrubbed by incoming cold sea water introduced through line 166 to condense water vapor. Vapor exits through line 167 for processing as described in FIG. 1 (Line 55). Sea water (TSW) (which in this case is a combination of warm surface water that has been cooled in Zone I and cold sea water which had been warmed in Zone II) passes back to the sea through pipe 168 free of working fluid.

In the structure of FIG. 3 advantage is taken of hydraulic pressures prevailing due to the degree of the submersion of various parts of the apparatus. Zone I, which is the highest pressure zone, is at a suitable depth, for example, 40 feet such that incoming warm sea water (HSW) need not be pumped against a considerable head. Typically Zone II, which is intermediate in pressure and is above Zone I is about 18 feet below the surface of the sea. Zone III is essentially at atmospheric pressure and is at sea level. Zone IV is typically at about 0.25 psia and may be about 33 feet above the surface of the sea.

Among particular advantages of the preferred embodiments of the invention are the following: The stepwise treatment of cooled surface water and heated deep water (which are preferably combined for this purpose) results in eliminating all or practically all of the entrained liquid working fluid and a portion of the dissolved working fluid contained in this water, and does so at a relatively high pressure such as atmospheric. Therefore in the second step of flashing as in Zone IV of FIG. 1, which is carried out at a greatly reduced pressure, e.g. 0.25 psia, a much smaller volume of vapor has to be handled than would be handled if flashing were carried out in a single zone at a low pressure. Consequently the size of vacuum equipment and power requirements are greatly diminished. Further, the elimination of entrained liquid working fluid in Zone III at atmospheric pressure precludes its presence in the vacuum systems of Zone IV. The presence of accidentally entrained liquid working fluid in the vacuum system is upsetting to operation of the system.

Partial submergence as in FIG. 3 reduces pumping requirements. Thus the highest pressure zone (Zone I) is at the lowest level. Hydrostatic heads exist in line 111 and in the line leading from the sea; therefore, power requirements to pump against the prevailing pressure in stage 1 of Zone I (typically about 31 psia) are reduced. Cold deep sea water (CSW) is introduced into Zone II by line 130 under a back pressure of about 17 psia, which is equivalent to a hydrostatic pressure 6 feet below the sea surface. As the deep sea water (CSW) flows from stage 4 to stage 1, the pressure is increased hydrostatically except for about 0.5 to 1 foot free fall below each rain deck. By properly hydrostatically positioning the Zones, the lift on pump 131 can be limited to about 5–6 feet of head (required to overcome density differences between cold deep sea water and warmer sea water) and pumps 146, 150 and 155 can be limited to 1 to 10 feet. Minimizing pumping energy is very important.

The rain deck equipment shown at 95 in FIG. 2 and at 136 in FIG. 3 provides a maximum of interfacial area between the condensing vapor phase and the cooling liquid phase and the interface is continuously renewed and is not stagnant. Therefore, maximum rates of heat transfer result. Moreover, gas back pressures or friction drops are reduced to a minimum thereby increasing the head available for power generation in the prime mover.

The conduit or conduits which supply deep sea water (CSW) must, of course, be quite long, e.g. 1,000 feet or more and they must be so weighted and constructed that they will remain submerged to the desired depth. Pressure on the inside and outside is essentially the same but the density of cold deep sea water is slightly higher. The tubes must resist crushing at the modest pressure differentials (5–6 feet of head near the surface) these differences cause. Flexible tubing of plastic or fabric construction such as nylon or polyester reinforced and weighted by inside or outside rings or spirally wound with such material may be used.

Figure 4:
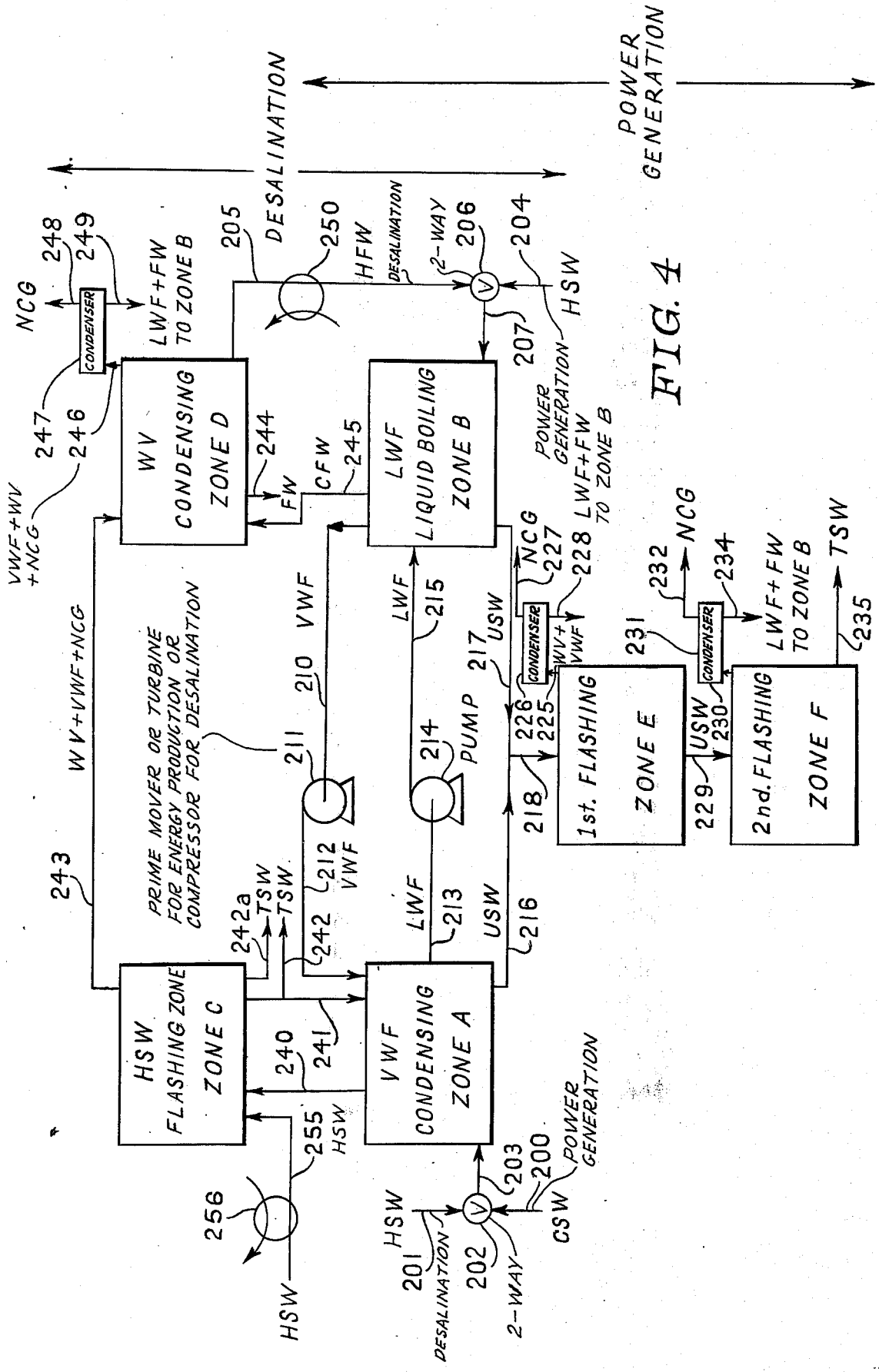
FIG. 4 is a diagrammatic view of a combined desalination-energy production system.

Referring now to FIG. 4 there is shown diagrammatically a combined energy production-desalination system. The two components of this system (i.e. the energy production component and the desalination component) may be operated jointly or alternately.

The various zones are appropriately labeled. Thus Zone A is the zone in which vapor of working fluid (VWF) is directly and intimately contacted with a relatively cold aqueous liquid (CSW) to cause condensation of vapor of working fluid (VWF) to liquid working fluid (LWF) and to cause heating of aqueous liquid. Zone B is the boiling zone for liquid working fluid (LWF) in which liquid working fluid is directly and intimately contacted with a relatively warm or hot aqueous liquid (HW) with resultant boiling of the liquid working fluid and its conversion to vapor of working fluid and cooling of the aqueous liquid. Zones A and B are common to the desalination and energy production aspects of the system. (Each of Zones A through F may be a single or multi-stage Zone).

Referring to the left of FIG. 4, cold deep sea water (CSW) for the power generation component enters through line 200 and surface sea water (HSW) for the desalination component enters through line 201. The numeral 202 indicates, for example, a valve by which one or the other (i.e. cold deep sea water (CSW) entering through line 200 or surface sea water (HSW) entering through line 201) may be routed to the system. The cold deep sea water (CSW) or warm surface sea water (HSW) according to setting of valve 202 passes through line 203 to Zone A for processing as described hereinafter. Referring now to the right hand side of FIG. 4, warm surface sea water (HSW) enters through line 204 for the energy component and recycled hot fresh water (HFW) passes through line 205 for the desalination component. A selector valve 206 allows either recycled hot fresh water (HFW) from line 205 or warm surface sea water (HSW) from line 204 to be admitted to Zone B. The selected liquid passes through line 207 to Zone B for processing as hereinafter described.

Vapor of working fluid (VWF) produced in Zone B passes through line 210. If the system is used for energy production it passes through a prime mover such as a gas turbine 211 and the exhaust vapor (VWF) pass through line 212 to Zone A. If the system is used for desalination, the vapor (VWF) bypasses prime mover 211 or the latter is instead a pump or compressor which may provide an outside energy input to the system when used for desalination. The liquid working fluid resulting from condensation in Zone A is pumped through a line 213 by a pump 214 to a line 215 and is returned to Zone B.

Referring now to either the energy production component or desalination component of the system, heated deep sea water (USW) separated from liquid working fluid (LWF) in Zone A is passed through line 216 and cooled surface sea water (USW) separated from liquid working fluid (LWF) in Zone B passes through line 217. The two streams are joined in a single line 218. (As will be evident from the discussion of FIGS. 1 to 3 above, these two streams may, if desired, be treated separately.) The combined effluent sea water (USW) is treated first in Zone E by pressure reduction to, for example, approximately atmospheric pressure and a mixture of water vapor (WV), vapor of working fluid (VWF) and non-condensibles (NCG) passes through a line 225 to a condensor 226 resulting in condensation of vapor VWF to LWF and of water vapor to liquid water (FW). The non-condensibles (NCG) are vented through line 227 and the mixture of LWF and fresh water (FW) are drawn off through a line 228. The LWF may be separated from the water and returned to Zone B, e.g., by routing it to line 213. The fresh water (FW) separated from LWF may be discarded or it may constitute by-product fresh water (FW).

Further pressure reduction is carried out by passing liquid from Zone E through line 229 to Zone F wherein the process of flashing is repeated at lower pressure, resulting in a mixture of vapor VWF, water vapor (WV) and non-condensibles which leave through line 230 to a condenser 231. The non-condensibles (NCG) are vented at 232 and a mixture of liquid working fluid (LWF) and water (FW) pass through line 234 back to Zone B. Treated sea water (TSW) is removed from the system and returned to the sea through line 235 devoid of any significant quantity of liquid working fluid.

In the desalination component or aspect of the system heated sea water (HSW) (which is preferably warmer surface water) heated in Zone A by condensation of vapor VWF passes through line 240 to sea water flashing Zone C and unevaporated sea water is returned to Zone A through line 241. A certain proportion of the circulating sea water is withdrawn and returned to the sea through line 242. Instead of recycling sea water through line 241, all of it may be vented through line 242 to the sea. This vented sea water (TSW) is quite free of dissolved and entrained liquid working fluid by reason of the flashing step in Zone C.

Zone C is preferably a multi-stage flashing zone such as described in my aforesaid U.S. Pat. Nos. 3,640,850 and 3,856,631, and lines 241 and 242 will contain only sea water (TSW) from the last stage which is the freest of working fluid because it has been flashed at a succession of diminishing pressures.

Water vapor containing vapor of working fluid (VWF) and non-condensibles (NCG) passes from Zone C through line 243 to Zone D. In Zone D the vapor-gas mixture is contacted with circulating fresh water (CFW) which has been cooled as a result of contacting HFW with LWF and hence boiling liquid working fluid (LWF) in Zone B. The cold fresh water condenses water vapor entering Zone D through line 243. A certain proportion of circulating fresh water (FW) is withdrawn from the system as product through line 244, preferably at an early stage of Zone D. This fresh water will be devoid of any significant quantity of working fluid by reason of the fact that, under the prevailing conditions it does not condense in the fresh water in Zone D. A mixture of vapor of working fluid (VWF), water vapor (WV) and non-condensibles (NCG) passes from Zone D through line 246 to a condenser 247 wherein the vapor (VWF) is condensed to liquid working fluid and water vapor is condensed to liquid water which are removed through line 249. As in the case of the mixture of LWF and FW removed from condenser 226 through line 228, this mixture may be separated into LWF and FW. The LWF is returned to Zone B, e.g., by routing it to line 213, and the FW may be discarded or may constitute an additional increment of product fresh water (FW). Non-condensibles (NCG) are vented from the system through line 248. Fresh water (FW) circulating through Zone D is heated by absorption of the latent heat of condensation of water vapor coming from Zone C through line 243. The reheated fresh water, is passed through line 205 back to Zone B. An energy input in addition to that provided by compressor 211 may be provided by a heat exchanger 250 supplied with exhaust steam from a steam power plant.

Another method of operating the system and desalination plant is as follows: Lines 240 and 241 together with compressor 211 are omitted (or are closed off by suitable valves not shown and bypassed); lines 210 and 212 are joined; warm surface sea water (HSW) enters through line 255 directly into sea water flashing Zone C and unevaporated sea water is vented to the sea through line 242a at a depth corresponding to the temperature of the effluent sea water if that is desired. Zone C and Zone D will be staged zones with each stage of Zones C in vapor communication (but not liquid communication) with the corresponding stage of Zone D (that is, the stages of Zone C and D are arranged in pairs such that vapor produced in any stage of Zone C is conndensed in the corresponding paired stages of Zone D). Efficient liquid-vapor contact in Zone C and efficient liquid vapor contact in Zone D will be maintained. For example, efficient contact may be maintained by the apparatus of FIGS. 2 and 3 in my co-pending application, Ser. No. 224,018 (now U.S. Pat. No. 3,856,631) wherein Zone III corresponds to Zone C of the present application and Zone IV corresponds to Zone D of the present application. By such efficient staged contact and flashing apparatus the sensible heat of warm surface sea water (e.g. that entering Zone C through line 255, at 85° F. and leaving Zone C at 242a at 40° F.) can be used as the heat input to the system supplemented, if desired, by make-up heat as by means of a heat exchanger 256 in line 255. The relatively warm condensate leaving Zone D through line 205 is used in Zone B as described above to vaporize liquid working fluid (LWF). This provides for the cooling of fresh water to act as the condensing medium in Zone D and it provides product water (withdrawn through line 244) at a cooler and more acceptable temperature. The vapor of working fluid (VWF), instead of being used to heat incoming sea water as described above (i.e. to heat surface sea water entering through line 201) is condensed by cold deep sea water (CSW) entering through line 200 as in the energy production aspect of the system and the resulting condensate of working fluid (LWF) is pumped through line 213 by pump 214 to line 215 and thence back to Zone B. In this embodiment of the invention cold deep sea water (CSW), after having served to condense vapor (VWF) and having been heated thereby, contains a certain amount of entrained and dissolved liquid working fluid. This used sea water (USW) leaves through line 216 to the first and second flashing Zones E and F for removal of traces of entrained and dissolved working fluid as described above. The line 217 is not needed in this embodiment of the invention inasmuch as only fresh water circulates through Zone B and the problem of ridding it of non-condensible gases (NCG) and entrained and dissolved working fluid are carried out as described above by means including condensor 247.

It will, therefore, be apparent that novel and advantageous methods, systems and apparatus have been provided for the efficient extraction of heat from bodies of warm or hot water, for efficient utilization of the extracted heat to produce mechanical energy, for efficient utilization of cold or cool bodies of water to condense the vapor of working fluid employed in the process and for eliminating or greatly reducing pollution. The method, system and apparatus are useful for desalination, for energy production and for both such purposes in conjunction.

I claim:
1. A method of producing mechanical energy from a first body of relatively warm or hot aqueous liquid (HW) and a second body of relatively cold or cool aqueous liquid (CW) which comprises:
   a. providing a body of working fluid (WF) which is immiscible with water, which boils at a temperature substantially below that of water, which has a density sufficiently different than that of water and dilute aqueous saline solutions to allow gravity separation of the liquid working fluid (LWF) from water and such solutions and which is capable of condensation from the vapor state to the liquid state within a temperature range of about −50° to 175° F. at atmospheric pressure,
   b. providing a first, evaporating zone (Zone I);
   c. providing a second, condensing zone (Zone II);
   d. continuously circulating aqueous liquid (HW) from said first body through Zone I and simultaneously and continuously introducing said working fluid in the liquid state (LWF) into Zone I and intimately and directly contacting it with said first body (HW) in Zone I to effect direct heat transfer from said first body (HW) to the liquid working fluid (LWF), thereby evaporating the liquid working fluid (LWF) and producing vapor of working fluid (VWF);
   e. providing also a combustionless energy convertor operable by gas pressure and having a gas inlet and a gas outlet for passage of gas therethrough to operate the same, and passing the vapor of working fluid (VWF) produced in Zone I and resulting from step (d) through said energy converter from its inlet to its outlet thereby operating said energy converter, and continuously withdrawing cooled, spent vapor of working fluid (VWF) from the outlet of said energy converter,
   f. simultaneously and continuously passing aqueous liquid (CW) from said second body and the spent vapor of working fluid (VWF) resulting from step (e) through Zone II in intimate and direct contact with one another whereby said vapor is condensed to liquid working fluid (LWF),
   g. continuously separating the warmed aqueous liquid (UW) and the liquid working fluid (LWF) resulting from step (f),
   h. continuously recycling the separated liquid working fluid (LWF) resulting from step (g) to step (d), and
   i. discharging from the system the cooled aqueous liquid (UW) resulting from step (d) and the heated aqueous liquid (UW) resulting from step (f).

2. The method of claim 1 wherein the liquid working fluid (LWF) is less dense than water.

3. The method of claim 1 wherein said first body of aqueous liquid (HW) is warm surface sea water (HSW) and said second body of aqueous liquid (CW) is sea water (CSW) drawn from a depth such that it is substantially colder than the surface sea water.

4. The method of claim 1 wherein both aqueous liquids (UW) resulting from steps (d) and (f) are treated to remove entrained and dissolved working fluid (WF) before they are discharged from the system as treated water (TW).

5. The method of claim 1 wherein step (g) is carried out by gravity in a quiescent settling zone.

6. The method of claim 1 wherein said first body of aqueous liquid (HW) is geothermal water.

7. The method of claim 1 wherein the cooled aqueous liquid (UW) resulting from step (d) and the warmed aqueous liquid (UW) resulting from step (f) are passed through at least one zone of reduced pressure to flash entrained and dissolved working fluid (WF) prior to discharge in step (i).

8. The method of claim 7 wherein the cooled aqueous liquid (UW) and warmed aqueous liquid (UW) are combined and are flashed together.

9. The method of claim 8 wherein such pressure reduction and flashing are carried out in separate stages including a first stage wherein the pressure is reduced to an intermediate pressure and a second stage wherein the pressure is reduced to substantially less than atmospheric thereby producing TW.

10. The method of extracting useful mechanical energy from a body of water having warm surface water (HW) and cold deep water (CW) which comprises:
   a. providing a body of working fluid (WF) which is water immiscible, which boils at a temperature substantially less than that of water, which has a density sufficiently different from that of water to allow gravity separation and which boils at temperatures of about −50° to 175° F. at atmospheric pressure,
   b. providing a multi-stage vaporizing zone (Zone I) having $m$ stages ($m$ being a positive integer) and a multi-stage condensing zone (Zone II) having $n$ stages ($n$ being a positive integer), each stage of each zone being adapted to cause direct, intimate contact between the fluids therein, each stage of Zone II having a separate gas inlet and each stage of Zone I having a separate gas outlet, c. continuously conducting warm surface water (HW) from said body thereof into the stages of Zone I and causing it to pass through successive stages from stage 1 to stage $m$ thereof, meanwhile continuously introducing liquid working fluid (LWF) into Zone I and intimately contacting the water (HW) and the liquid working (LWF) in each stage of Zone I at diminishing temperatures and pressures from stage 1 to stage $m$, thereby causing the production of an increment of vapor of working fluid (VWF) in each such stage at succesively diminishing pressures and temperatures, d. providing a combustionless multi-stage gas prime mover driven by expanding gases having a plurality of inlets and a plurality of outlets for, respectively, introduction of vapor into the inlets at different pressures ranging from a highest pressure to a lowest pressure and to vent spent vapor at different pressures ranging from a highest pressure to a lowest pressure, e. introducing each increment of vapor (VWF) produced in the stages of Zone I into an appropriate inlet of said prime mover and withdrawing increments of spent vapor (VWF) from the outlets of said prime mover at different pressures ranging from a highest pressure to a lowest pressure, f. continuously passing the resulting increments of vented spent vapor (VWF) into separate stages of Zone II ranging from stage 1 to stage $n$ and with the temperature and pressure of vapor (VWF) introduced into the stages diminishing from stage 1 to stage $n$, and causing said cold deep water (CW) to pass continuously through Zone II from stage $n$ thereof to stage 1 in intimate, direct contact with the increments of vapor (VWF) introduced into Zone II, thereby condensing an increment of vapor (VWF) to liquid working fluid (LWF) in each such stage, the flow of liquids in Zone II being from stage $n$ to stage 1 and g. separating warmed water (UW) from liquid working fluid (LWF) derived from stage 1 of Zone II and recycling the separated liquid Working fluid (LWF) to Zone I and h. separating cooled water (UW) from zone I and i. discharging from the system the water (UW) separated in steps (g) and (h).

11. A method of operating a multi-stage prime mover driven by expanding gases and having a plurality of gas inlets and a plurality of gas outlets, the gas inlets receiving gas at different pressures ranging from a highest to a lowest and the outlets venting spent gas at different pressures ranging from a highest to a lowest, said method comprising:

a. providing a first vaporizing zone (Zone I) having $m$ stages adapted to cause direct, intimate contact between two immiscible liquid phases to produce in each stage an increment of vapor of one of the liquids at pressures diminishing from a highest pressure in stage 1 to a lowest pressure in stage $m$, b. providing also a second, condensing zone (Zone II) having $n$ stages each adapted to cause direct intimate contact of a vapor with a liquid to condense in each stage an increment of vapor to the liquid state, c. providing a body of working fluid (WF) which is immiscible with water, which has a density sufficiently different from that of water to allow separation by gravity and which boils at a temperature substantially below the boiling point of water, d. continuously passing warm aqueous liquid (HW) through Zone I from stage 1 thereof through successive stages to stage $m$ thereof, e. continuously passing cold aqueous liquid (CW) through Zone II from stage $n$ thereof through succesive stages to stage 1 thereof, f. causing intimate, direct contact of warm aqueous liquid (HW) and liquid working fluid (LWF) in each stage of Zone I and producing in each stage an increment of vapor of working fluid (VWF), the vapor pressures of the increments diminishing from stage 1 through stage $m$, g. passing the resulting increments of vapor of working fluid (VWF) from the respective stages of Zone I to the respective inlets of said prime mover and venting spent vapor of working fluid (VWF) from the prime mover in increments through the separate outlets thereof, thereby operating the prime mover and obtaining useful energy, h. passing the increments of spent vapor of working fluid (VWF) from the outlets of said prime mover to the respective stages of Zone II, the highest pressure increment passing to stage 1 and the lowest pressure increment to stage $n$ and intermediate increments to intermediate stages, i. introducing cold aqueous liquid (CW) into stage $n$ of Zone II and causing it to pass through successive stages to stage 1 of Zone II and causing direct, intimate contact of such liquid (CW) with the increments of vapor (VWF) introduced into the several stages thereby producing an increment of liquid working fluid (LWF) in each stage, j. separating liquid working fluid (LWF) derived from stage 1 of Zone II from aqueous liquid (W) and recycling the separated liquid working fluid (LWF) to Zone I and, k. withdrawing and discharging aqueous liquid (UW) from stage $m$ of Zone I and from stage 1 of Zone II.

12. The method of claim 11 wherein the aqueous liquid (UW) withdrawn from stage 1 of Zone II and the aqueous liquid (UW) withdrawn from stage $m$ of Zone I are subjected to reduction of pressure in at least one zone to flash dissolved and entrained working fluid.

13. The method of claim 11 wherein the warm aqueous liquid (HW) is geothermal water.

14. The method of claim 11 wherein the warm aqueous liquid (HW) is the surface water of a body of water and the cold aqueous liquid (CW) is deeper water of the same body of water and the liquid working fluid (LWF) has a boiling point at atmospheric pressure not greater than about 100°F. and is less dense than water.

15. The method of claim 14 wherein the working fluid (WF) is a hydrocarbon.

16. A method of extracting heat from a body of warm water and converting the heat to useful mechanical energy which comprises:

a. providing a first zone (Zone I) for vaporizing a water immiscible liquid working fluid (LWF) which boils at a temperature below the boiling point of water, which has a density sufficiently different from that of water and dilute saline solutions to allow gravity separation of a mixture of water or dilute aqueous saline solution from said liquid working fluid (LWF), said zone I being adapted to promote intimate and direct contact of water and liquid working fluid (LWF) and thereby to transfer heat from a body of warm aqueous liquid (HW) to said liquid working fluid (LWF) and to cause vaporization thereof, b. providing a second zone (Zone II) for condensing vapor of liquid working fluid (VWF) by intimate and direct contact of such vapor with cold aqueous liquid (CW), c. causing continuous passage of warm aqueous liquid (HW) and of liquid working fluid (LWF) through Zone I in intimate and direct contact with one another to produce vapor of working fluid (VWF), d. utilizing such vapor of working fluid (VWF) to produce useful mechanical energy by passage into, through and out of a combustionless gas pressure-to-mechanical energy converter, thereby producing useful mechanical energy and cooling the vapor of working fluid (VWF), e. continuously passing the resulting cooled vapor of working fluid (VWF) through Zone II and intimately and directly contacting it with cold aqueous liquid (CW) which is also continuously passed through Zone II thereby causing condensation of vapor of working fluid (VWF) to produce liquid working fluid (LWF) and producing a mixture of aqueous liquid (UW) and liquid working fluid (LWF), f. separating liquid working fluid (LWF) from the mixture of aqueous liquid (UW) and liquid working fluid (LWF) resulting from step (e);

g. recycling the resulting separated liquid working fluid (LWF) to Zone I, and h. removing from the system the cooled aqueous liquid (UW) resulting from step (c) and heated aqueous liquid (UW) resulting from step (f).

17. The method of claim 16 wherein the aqueous liquids (UW) separated in step (h) are subjected in at least one zone to a pressure reduction to flash dissolved and entrained working fluid (WF) and are thereafter discarded to the environment as TW.

18. The method of claim 16 wherein said warm aqueous liquid (HW) is geothermal water.

19. The method of claim 16 wherein the warm aqueous liquid (HW) introduced into Zone I is derived from the warm surface water of a body of water and the cold aqueous liquid (CW) introduced into Zone II is derived from the same body of water at a depth.

20. The method of claim 17 wherein the liquid working fluid is less dense than water and dilute aqueous saline solutions.

21. The method of claim 20 wherein the liquid working fluid (LWF) is a hydrocarbon.

22. Apparatus for extracting and utilizing thermal energy from a body of heated aqueous liquid (HW) which comprises:

a. a first, vaporizing zone (Zone I) and a second, condensing zone (Zone II);

b. a gas pressure-to-mechanical energy converter which operates upon gas pressure without combustion to produce mechanical energy and which has inlet means for gas under pressure and outlet means for spent gas, c. a body of water immiscible liquid working fluid (LWF) which boils below the boiling point of water and which has a density sufficiently different from that of water to allow gravity separation of a mixture of such liquid with water, d. means in Zone I for effecting and maintaining continuous direct and intimate contact between two immiscible liquids, e. means in Zone II for effecting and maintaining continuous direct and intimate contact of a liquid phase with a vapor phase, f. means for maintaining a continuous flow of said heated aqueous liquid (HW) into and through Zone I for direct and intimate contact with said liquid working fluid (LWF) to vaporize the same to vapor of working fluid (VWF), g. means for continuously conveying the vapor (VWF) so produced in Zone I to the inlet means of said energy converter, h. means for continuously conveying spent vapor of working fluid (VWF) from the outlet of said energy converter to Zone II, i. means for continuously supplying cold aqueous liquid (CW) to Zone II and passing it therethrough in direct and intimate contact with vapor of working fluid (VWF) derived from the outlet of said energy converter and for condensing said vapor (VWF) to liquid working fluid (LWF), j. means for separating the resulting mixture of aqueous liquid (UW) and liquid working fluid (LWF) produced in Zone II, and k. means for recycling the resulting separated liquid working fluid (LWF) to Zone I l. and means for removing cooled aqueous liquid (UW) from Zone I and for removing warmed aqueous liquid (UW) from Zone II.

23. The apparatus of claim 22 wherein the energy converter is a multiple stage gas turbine having a plurality of inlets for receiving vapor of working fluid (VWF) at different pressures and a plurality of outlets for venting spent vapor of working fluid (VWF) at different pressures and each of Zones I and II is a multistage zone, the several stages of Zone I producing increments of vapor of working fluid (VWF) at different pressures for introduction into the respective inlets of the gas turbine and the several stages of Zone II effecting condensation of spent vapor of working fluid (VWF) from the respective outlets of the gas turbine.

24. The apparatus of claim 22 wherein the energy converter is a gas turbine.

25. The apparatus of claim 24 wherein at least one flashing zone is provided to receive aqueous liquid (UW) removed in step (1) to reduce the pressure thereof and to flash dissolved and entrained working fluid thereby producing treated water (TW).

26. The apparatus of claim 25 wherein the apparatus is partially submerged in the sea and Zones I and II and the flashing zone are arranged at different levels, Zone I being at the lowest level, Zone II at a higher level and the flashing zone at the highest level whereby pumping of liquid between the zones is facilitated by their different hydrostatic heads.

* * * * *